United States Patent
Jiao et al.

(10) Patent No.: US 12,435,624 B2
(45) Date of Patent: Oct. 7, 2025

(54) METHOD AND DEVICE FOR PROCESSING FUSED "UNDERGROUND+GROUND" DATA IN DEEP FORMATION EXPLORATION

(71) Applicants: CHINA UNIVERSITY OF GEOSCIENCES (WUHAN), Wuhan (CN); Institute of Rock and Soil Mechanics, Chinese Academy of Sciences, Wuhan (CN)

(72) Inventors: Yuyong Jiao, Wuhan (CN); Xuefeng Yan, Wuhan (CN); Yule Hu, Wuhan (CN); Zengqiang Han, Wuhan (CN); Yiteng Wang, Wuhan (CN); Luyi Shen, Wuhan (CN); Junpeng Zou, Wuhan (CN); Fei Zheng, Wuhan (CN); Peng Zhang, Wuhan (CN)

(73) Assignees: CHINA UNIVERSITY OF GEOSCIENCES (WUHAN), Wuhan (CN); Institute of Rock and Soil Mechanics, Chinese Academy of Sciences, Wuhan (CN)

( * ) Notice: Subject to any disclaimer, the term of this patent is extended or adjusted under 35 U.S.C. 154(b) by 0 days.

(21) Appl. No.: 18/398,188

(22) Filed: Dec. 28, 2023

(65) Prior Publication Data
US 2025/0020055 A1 Jan. 16, 2025

(30) Foreign Application Priority Data
Jul. 10, 2023 (CN) .......................... 202310845089.0

(51) Int. Cl.
*E21B 47/12* (2012.01)
*E21B 47/26* (2012.01)

(52) U.S. Cl.
CPC .............. *E21B 47/12* (2013.01); *E21B 47/26* (2020.05)

(58) Field of Classification Search
CPC ........ E21B 47/12; E21B 47/26; E21B 17/026; E21B 19/00; E21B 19/02
See application file for complete search history.

(56) References Cited

U.S. PATENT DOCUMENTS

| | | | | |
|---|---|---|---|---|
| 5,321,613 | A | * | 6/1994 | Porter ................... G06F 18/251 702/1 |
| 5,546,672 | A | * | 8/1996 | Campbell ................. G01P 3/50 33/735 |

(Continued)

*Primary Examiner* — Franklin D Balseca
(74) *Attorney, Agent, or Firm* — True Shepherd LLC; Andrew C. Cheng

(57) ABSTRACT

A method for processing fused "underground+ground" data in deep formation exploration includes: collecting underground multi-source data by an underground intelligent probing rod, preprocessing the multi-source data to obtain an original digital signal, storing the original digital signal in an underground memory, obtaining continuous depth data by a ground device; performing high-bitrate and low-bitrate compression on the original digital signal, and modulating compressed signals; driving modulated signals by power, so the modulated signal is transmitted in a drilling stem with cable in a form of a power line carrier and then output, or first transmitted in a first section of the drilling stem with cable, re-collected in a short drill pipe with repeater, re-emitted to a second section of the drilling stem with cable, and then output; when a transmission line is disconnected, synchronizing and fusing data; and finally using fused data and the data output by the transmission line as final output data.

6 Claims, 2 Drawing Sheets

(56) References Cited

U.S. PATENT DOCUMENTS

| | | |
|---|---|---|
| 11,421,523 B2 * | 8/2022 | Venkatakrishnan ..... G06N 7/01 |
| 11,636,180 B2 | 4/2023 | Wang et al. |
| 11,648,682 B2 | 5/2023 | Gao et al. |
| 11,679,774 B1 | 6/2023 | Shen et al. |

* cited by examiner

METHOD AND DEVICE FOR PROCESSING FUSED "UNDERGROUND+GROUND" DATA IN DEEP FORMATION EXPLORATION

CROSS-REFERENCE TO RELATED APPLICATIONS

This application claims priority to Chinese Patent Application No. 202310845089.0 with a filing date of Jul. 10, 2023. The content of the aforementioned application, including any intervening amendments thereto, is incorporated herein by reference.

TECHNICAL FIELD

The present disclosure relates to the field of data collection and processing, and in particular, to a method for processing fused "underground+ground" data in deep formation exploration.

BACKGROUND

With the rapid development of underground structural engineering construction, there is a rapidly increasing demand for engineering geological exploration. A condition of underground structural engineering can be obtained in advance through exploration. In this way, underground work can be correctly arranged. In addition, whether the underground structural engineering is abnormal can be predicted, and a safety risk of the underground structural engineering is evaluated to avoid a greater hidden danger and loss.

The patent document with Patent Application No. CN112761638A provides a method for determining a strike and a thickness of a coal seam, a data transmission device, and a data transmission system. During underground drilling, a drill collar obtains wellbore trajectory data sent by a measurement while drilling (MWD) device and formation gamma data sent by a gamma detection device, performs common coding on the wellbore trajectory data and the formation gamma data, and transmits commonly-coded wellbore trajectory data and formation gamma data to an upper computer through a single core. Then the upper computer analyzes the formation gamma data and the wellbore trajectory data, and determines a thickness and a strike of a coal seam. In this way, during the underground drilling, the drill collar can obtain real-time wellbore trajectory data and formation gamma data, and then determine the thickness and the strike of the coal seam based on the formation gamma data and the wellbore trajectory data, thereby guiding the drill collar in real time to drill along the coal seam. In this way, the thickness and the strike of the coal seam can be determined without frequent branching, reducing construction difficulty and improving coal mining efficiency.

In the invention, the MWD device can obtain data about the thickness and the strike of the underground coal seam, but has a simple data transmission and processing method, which is greatly affected by a formation. In addition, data obtained through MWD is mainly geophysical data, which cannot intuitively reflect an underground situation.

SUMMARY OF PRESENT INVENTION

In order to solve the above problems, the present disclosure provides a method for processing fused "underground+ground" data in deep formation exploration, including the following steps:

S1, collecting underground multi-source data by using an underground intelligent probing rod, preprocessing the multi-source data to obtain an original digital signal, storing the original digital signal in an underground memory, receiving continuous exploration depth data by using a ground device, and extracting data about a correspondence between an exploration depth and time in the continuous exploration depth data;

S2, performing high-bitrate or low-bitrate compression on the original digital signal, and modulating a compressed signal into an analog signal to obtain a high-bitrate-compressed and modulated analog signal and a low-bitrate-compressed and modulated analog signal;

S3, driving the high-bitrate-compressed and modulated analog signal by power, such that the high-bitrate-compressed and modulated analog signal is transmitted in a drilling stem with cable in a form of a power line carrier and then output; and driving the low-bitrate-compressed and modulated analog signal by power, such that the low-bitrate-compressed and modulated analog signal is first transmitted in a first section of the drilling stem with cable in the form of the power line carrier, re-collected in a short drill pipe with repeater, re-emitted to a second section of the drilling stem with cable, and then output after being demodulated;

S4, when a line between the drilling stem with cable and the short section of the relay is disconnected, extracting data about a correspondence between data of the original digital signal and time in the original digital signal stored in the underground memory, synchronizing and fusing the data about the correspondence between the data and the time, and the data about the correspondence between the exploration depth and the time, and outputting fused data; and S5, merging the output data in the S3 and the S4 as a final data output.

In one embodiment, the underground multi-source data in the S1 includes signals collected by a laser radar, a camera, a sonar, and an electronic compass.

In one embodiment, the preprocessing the multi-source data in the S1 includes: sampling, quantizing, and filtering the multi-source data to obtain the original digital signal.

In one embodiment, a threshold is set in the S2, the low-bitrate compression is adopted for an original digital signal whose data volume is greater than the threshold, and the high-bitrate compression is adopted for an original digital signal whose data volume is less than the threshold.

In one embodiment, the high-bitrate-compressed and modulated analog signal and the low-bitrate-compressed and modulated analog signal in the S2 are secondarily-coded serial data.

The present disclosure further provides a device for processing fused "underground+ground" data in deep formation exploration, including:

a processor; and a memory storing a computer program that can run on the processor; where the computer program is executed by the processor to implement the method for processing fused "underground+ground" data in deep formation exploration.

The technical solutions provided by the present disclosure have following beneficial effects.

The present disclosure provides a method for processing fused "underground+ground" data in deep formation exploration, which is more feasible compared with the method described in the background. According to the method provided in the present disclosure, underground multi-source data is collected by using an underground intelligent probing rod and preprocessed to obtain an original digital signal. The original digital signal is stored in an underground memory. Continuous depth data is obtained by using a ground device. High-bitrate or low-bitrate compression is performed on the original digital signal, and a compressed signal is modulated. A modulated signal is driven by power, such that the modulated signal is transmitted in a transmission line in a form of a power line carrier. Specifically, the modulated signal is first transmitted in a drilling stem with cable and then output, or is first transmitted in a first section of the drilling stem with cable, re-collected in a short drill pipe with repeater, re-emitted to a second section of the drilling stem with cable, and then output. When the transmission line is disconnected, data about a correspondence between data and time, and data about a correspondence between an exploration depth and time are synchronized and fused. Finally, fused data and the data output by the transmission line are used as a final data output. Based on different underground conditions, different ground and underground data transmission methods can be used. In addition, a large amount of data with a wide variety of types and strong visibility can be collected, which can more intuitively reflect an underground situation. What's more, the underground situation can be monitored in real time, and measurement data of the intelligent probing rod can be continuous in time and depth.

DETAILED DESCRIPTION OF THE EMBODIMENTS

In order to make the objectives, technical solutions, and advantages of the present disclosure clearer, implementations of the present disclosure will be further described in detail in conjunction with the accompanying drawings.

Figure 1:
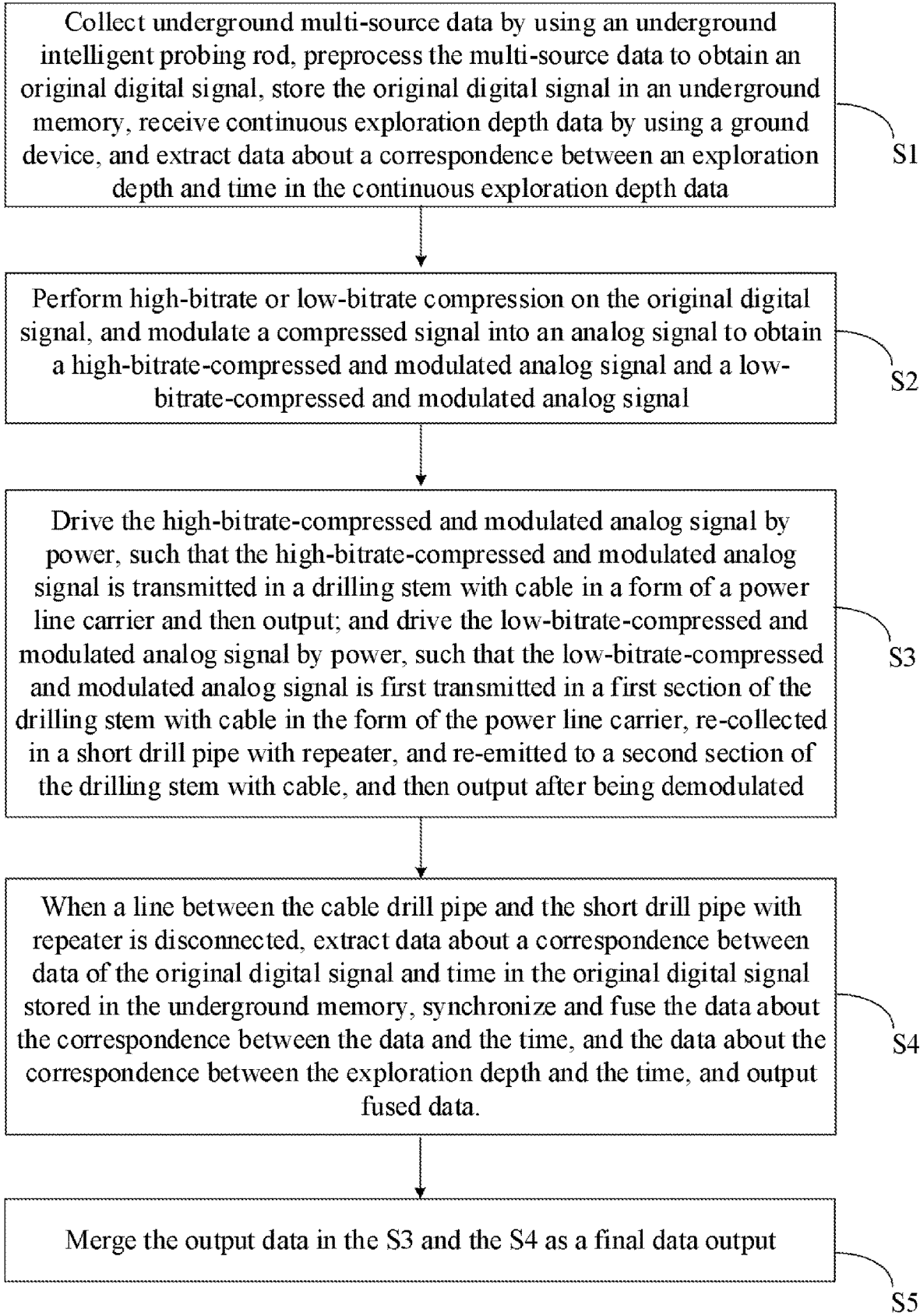
FIG. 1 is a flowchart showing a method for processing fused "underground+ground" data in deep formation exploration according to an embodiment of the present disclosure.
Figure 2:
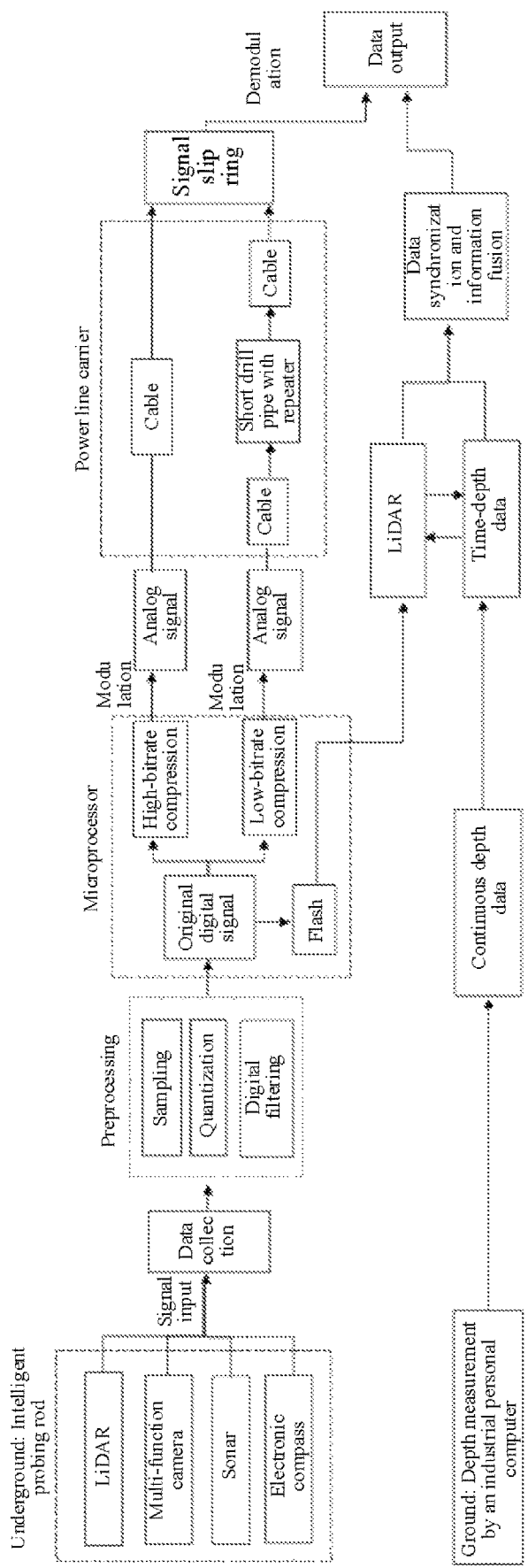
FIG. 2 is a flow block diagram showing a method for processing fused "underground+ground" data in deep formation exploration according to an embodiment of the present disclosure.

FIG. 1 and FIG. 2 are respectively a flowchart and a flow block diagram showing a method for processing fused "underground+ground" data in deep formation exploration according to an embodiment of the present disclosure. The method specifically includes the following steps:

In S1, underground multi-source data is collected by using an underground intelligent probing rod. The multi-source data includes signals collected by a laser radar, a camera, a sonar, and an electronic compass. Preprocessing such as sampling, quantization, and filtering is performed on the multi-source data to obtain an original digital signal, and the original digital signal is stored in an underground memory. Continuous exploration depth data is received by using a ground device, and data about a correspondence between an exploration depth and time is extracted from the continuous depth data.

In a further embodiment, the ground device includes a demodulator for signal conversion, a data memory, an industrial personal computer for real-time communication, and a platform controller. The intelligent probing rod is controlled by the platform controller and the industrial personal computer.

A modem is divided into an underground modulator and a ground demodulator.

The modem is connected to a power system of the intelligent probing rod to achieve bidirectional transmission of a power line carrier signal. The modem is connected to the industrial personal computer to extract a digital signal from the power line carrier and record a data flow.

A signal modulated by the modulator needs to be transmitted to the ground demodulator by using the power line carrier.

The power line carrier superimposes a high-frequency signal on a power transmission line, enabling a power line to transmit power and data signals simultaneously.

In the intelligent probing rod, the power system is used as underground and ground power lines to supply power to various sensors in the probing rod. The power system is also used as a signal transmission line of the power line carrier to transmit in signals collected by the sensors to the ground.

The exploration depth data is obtained as follows: A magnetic encoder obtains displacement data. The magnetic encoder uses a magnetic field and a magnetic sensing element (such as a Hall sensor) to measure a displacement. In the magnetic encoder, a base part contains one or more magnets, while a measurement part contains the magnetic sensing element. When the measurement part rotates or is linearly displaced with a moving object, a distribution of the magnetic field changes accordingly. The magnetic sensing element senses the change in the magnetic field and converts the change into an electrical signal. The electrical signal is transmitted to a ground industrial control device. The industrial control device analyzes data of the electrical signal to obtain continuous exploration depth information.

Measurement data is obtained, and an instruction is first transmitted to the intelligent probing rod through the ground industrial control device. The intelligent probing rod collects data by using the laser radar, the multi-function camera, the sonar, and the electronic compass. Driven by a clock signal, an output analog signal is sampled, quantized, filtered, and preprocessed to obtain the original digital signal.

In S2, high-bitrate or low-bitrate compression is performed on the original digital signal to avoid a data loss. A compressed signal is modulated into an analog signal to obtain a high-bitrate-compressed and modulated analog signal and a low-bitrate-compressed and modulated analog signal.

A threshold is set. The low-bitrate compression is adopted for an original digital signal whose data volume is greater than the threshold, and the high-bitrate compression is adopted for an original digital signal whose data volume is less than the threshold.

In a further embodiment, the high-bitrate-compressed and modulated analog signal and the low-bitrate-compressed and modulated analog signal are secondarily-coded serial data.

In S3, the high-bitrate-compressed and modulated analog signal is driven by power, such that the high-bitrate-compressed and modulated analog signal is transmitted in a drilling stem with cable in a form of the power line carrier and then output. Due to a large amount of data, the low-bitrate-compressed and modulated analog signal is driven by power, such that the low-bitrate-compressed and modulated analog signal is first transmitted in a first section of the drilling stem with cable in the form of the power line carrier, re-collected in a short drill pipe with repeater, re-emitted to a second section of the drilling stem with cable, and then output.

Considering signal attenuation, if a transmission distance of the signal is long, the short section of the signal relay is installed between drilling stem with cables at a certain interval to achieve a signal gain and fidelity, and increase the transmission distance of the signal.

In S4, when a line between the drilling stem with cable and the short section of the relay is disconnected, data about a correspondence between data of the original digital signal and time in the original digital signal stored in the underground memory is extracted. The data about the correspondence between the data and the time, and the data about the correspondence between the exploration depth and the time are synchronized and fused. Then fused data is output.

Based on time information, exploration data of the intelligent probing rod and depth data recorded on the ground are synchronously recorded to establish a correspondence between depth and measurement data, thereby achieving synchronous data information processing in a depth direction and time.

In S5, after a test is completed, software is used to merge the output data in the S3 and the S4 as a final data output, thereby ensuring continuity of the measurement data of the intelligent probing rod in the depth.

The embodiments further provide a device for processing fused "underground+ground" data in deep formation exploration, including:
- a processor; and
- a memory storing a computer program that can run on the processor.

The computer program is executed by the processor to implement the method for processing fused "underground+ground" data in deep formation exploration.

The above description of the disclosed embodiments enables those skilled in the art to achieve or use the present disclosure. Various modifications to these embodiments are readily apparent to those skilled in the art, and the generic principles defined herein may be practiced in other embodiments without departing from the spirit or scope of the present disclosure. Accordingly, the present disclosure will not be limited to these embodiments shown herein, but is to fall within the widest scope consistent with the principles and novel features disclosed herein.

What is claimed is:

1. A method for processing fused underground+ground data in deep formation exploration, comprising steps:
    S1, collecting underground multi-source data by using an underground intelligent probing rod, preprocessing the multi-source data to obtain an original digital signal, storing the original digital signal in an underground memory, receiving continuous exploration depth data by using a ground device, and extracting data about a correspondence between an exploration depth and time from the received continuous exploration depth data;
    S2, performing high-bitrate and low-bitrate compression on the original digital signal respectively, and modulating the compressed signals into an analog signal to obtain a high-bitrate-compressed and modulated analog signal and a low-bitrate-compressed and modulated analog signal respectively;
    S3, driving the high-bitrate-compressed and modulated analog signal by power, such that the high-bitrate-compressed and modulated analog signal is transmitted in a drilling stem with cable in a form of a power line carrier and then output; and driving the low-bitrate-compressed and modulated analog signal by power, such that the low-bitrate-compressed and modulated analog signal is first transmitted in a first section of the drilling stem with cable in the form of the power line carrier, re-collected in a short drill pipe with a repeater, re-emitted to a second section of the drilling stem with cable, and then output after being demodulated;
    S4, extracting data about a correspondence between data of the original digital signal and the time stored in the underground memory, synchronizing and fusing the data about the correspondence between the data of the original digital signal and the time, and the data about the correspondence between the exploration depth and the time, and outputting fused data; and
    S5, merging the output data in the S3 and the S4 as final output data.

2. The method according to claim 1, wherein the underground multi-source data in the S1 comprises signals collected by a laser radar, a camera, a sonar, and an electronic compass.

3. The method according to claim 1, wherein the preprocessing the multi-source data in the S1 comprises: sampling, quantizing, and filtering the multi-source data to obtain the original digital signal.

4. The method according to claim 1, wherein a threshold is set in the S2, the low-bitrate compression is adopted for an original digital signal whose data volume is greater than the threshold, and the high-bitrate compression is adopted for an original digital signal whose data volume is less than the threshold.

5. The method according to claim 1, wherein the high-bitrate-compressed and modulated analog signal and the low-bitrate-compressed and modulated analog signal in the S2 are secondarily-coded serial data.

6. A device for processing fused underground+ground data in deep formation exploration, comprising:
    a processor; and
    a memory storing a computer program that runs on the processor; wherein
    the computer program is executed by the processor to implement a method according to claim 1.

* * * * *